United States Patent [19]
Schuh et al.

[11] Patent Number: 5,790,437
[45] Date of Patent: Aug. 4, 1998

[54] GRAPHICAL INTERFACE FOR PROGRAMMING RAMPING CONTROLLERS

[75] Inventors: William C. Schuh, Delavan, Wis.; Thomas E. Nastek, Wonder Lake, Ill.

[73] Assignee: Watlow Electric Manufacturing Company, St. Louis, Mo.

[21] Appl. No.: 753,398

[22] Filed: Nov. 26, 1996

[51] Int. Cl.$^6$ .................................................. G05B 11/01
[52] U.S. Cl. .................. 364/579; 364/477.04; 364/496; 364/497; 364/498; 364/140; 364/147; 395/12; 395/76
[58] Field of Search .................. 364/579, 550, 364/280.4, 140.03, 477.03; 395/200.1, 353, 709; 706/140.03; 345/418, 134

[56] References Cited

U.S. PATENT DOCUMENTS

| | | | |
|---|---|---|---|
| 4,781,358 | 11/1988 | Langan | 266/80 |
| 5,164,895 | 11/1992 | Lunz et al. | 364/138 |
| 5,280,422 | 1/1994 | Moe et al. | 364/140 |
| 5,285,376 | 2/1994 | Struger et al. | 364/147 |
| 5,321,603 | 6/1994 | Schwenke | 364/146 |
| 5,431,339 | 7/1995 | Yoda | 236/46 R |
| 5,470,218 | 11/1995 | Hillman et al. | 425/144 |
| 5,475,610 | 12/1995 | Atwood et al. | 364/500 |
| 5,479,354 | 12/1995 | Husslein | 364/474.22 |
| 5,490,276 | 2/1996 | Doli, Jr. et al. | 395/700 |
| 5,491,625 | 2/1996 | Pressnall et al. | 364/133 |
| 5,579,482 | 11/1996 | Einkauf et al. | 395/200.1 |
| 5,594,663 | 1/1997 | Messaros et al. | 364/550 |
| 5,623,613 | 4/1997 | Rowe et al. | 395/353 |

OTHER PUBLICATIONS

Omega, The Temperature Handbook, vol. 29, pp. P–19–P–20, P–31–P–48, R–13–R–14, R–17–R24, 1995.

*Primary Examiner*—James P. Trammell
*Assistant Examiner*—Hien Vo
*Attorney, Agent, or Firm*—Herzog, Crebs & McGhee, LLP

[57] ABSTRACT

An interface for graphically programming a ramping controller coupled to and controlling an electric heater is implemented with a microcomputer. The interface presents to the user via a display device, a cartesian coordinate graph of temperature versus time onto which is plotted a desired temperature versus time (tvt) profile via an input device. The microcomputer translates the plotted tvt profile into controller logic to create a controller logic data file that is then uploaded into the ramping controller. The controller logic data file may be stored in memory. In addition to temperature, other functions or events may be plotted on the graph which are also translated into controller logic and uploaded to the ramping controller. Other features include data logging of heater parameters that may displayed in real time. The present invention eliminates cumbersome front panel entry of the data into the controller. A multiplicity of controllers, and thus heaters, may be coupled thereto and programmed through addressing. Additionally, all types of controllers may be monitored from a monitor screen.

19 Claims, 6 Drawing Sheets

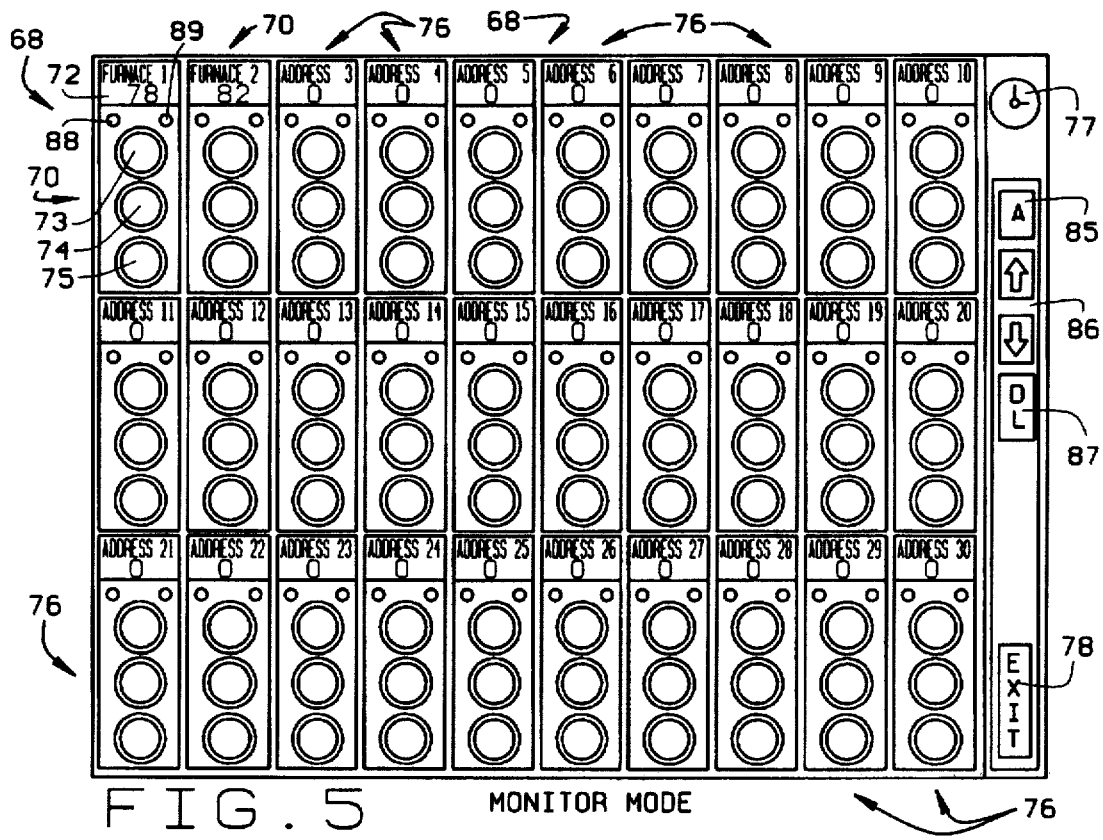
FIG.5  MONITOR MODE
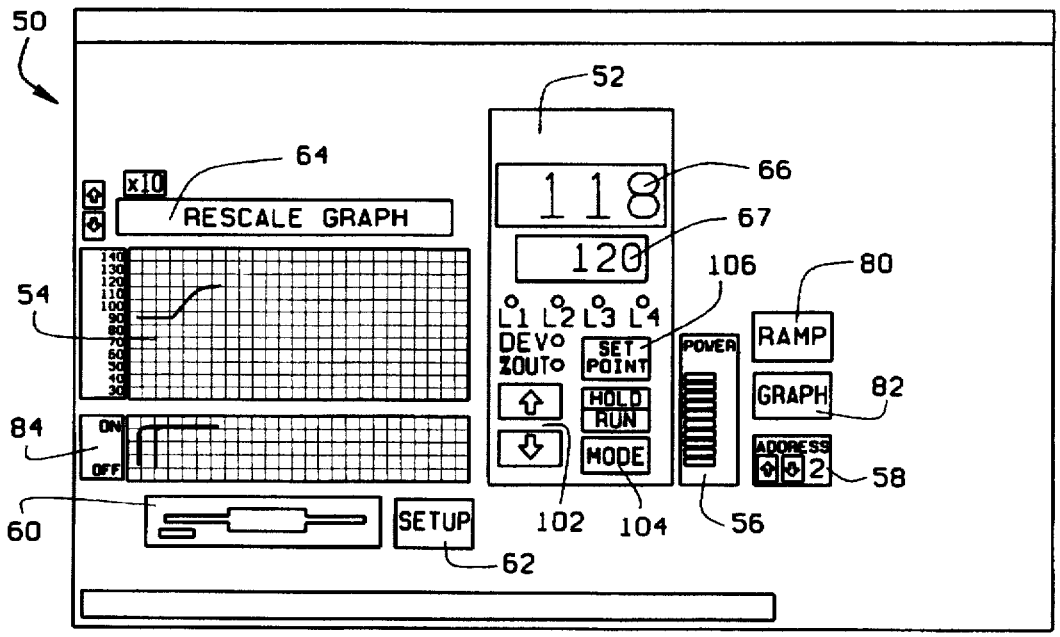
FIG.6  CONFIGURE MODE

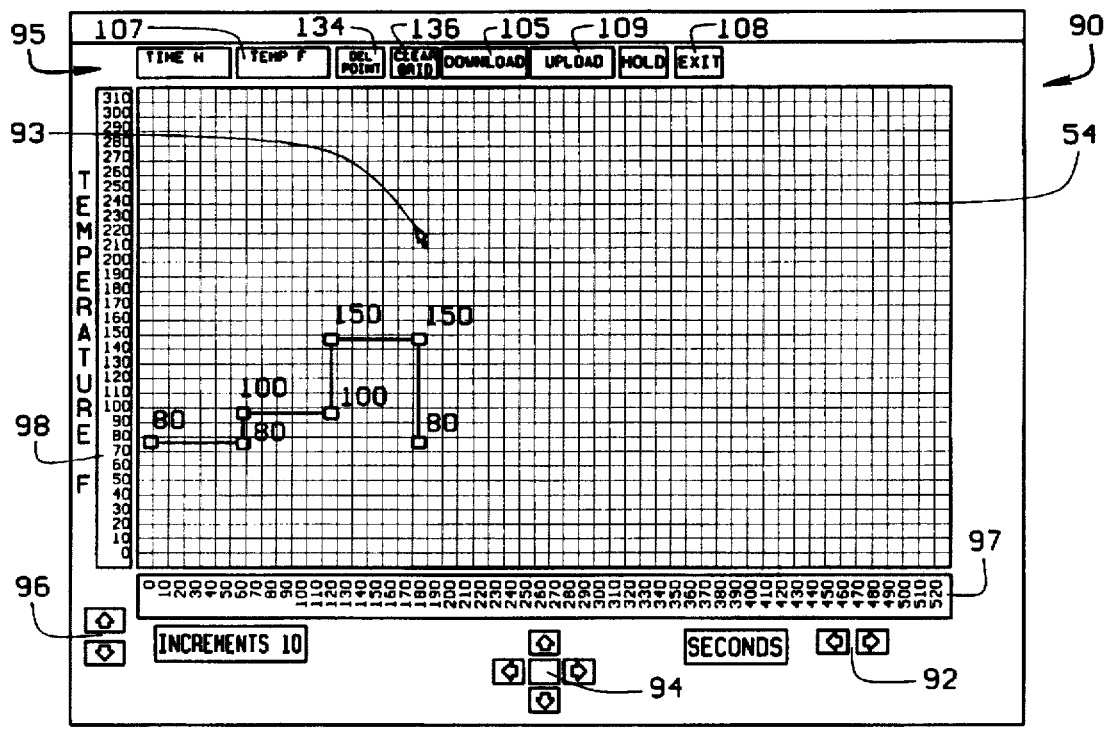
FIG. 7   RAMP MODE EXAMPLE #1
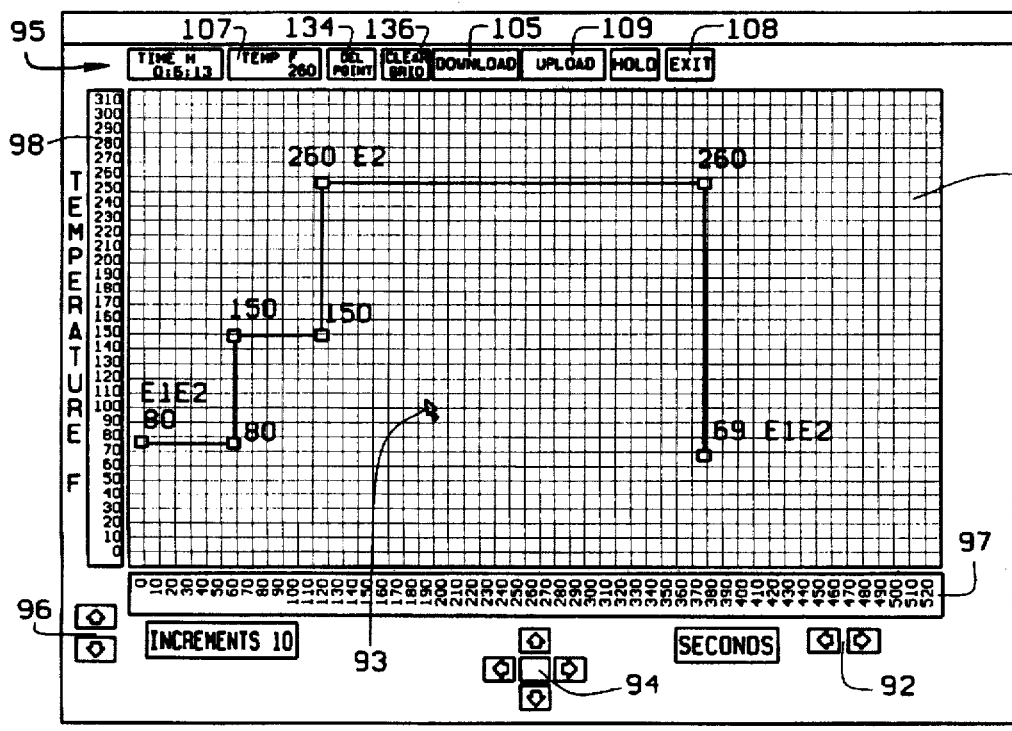
FIG. 8   RAMP MODE EXAMPLE #2

GRAPHICAL INTERFACE FOR PROGRAMMING RAMPING CONTROLLERS

FIELD OF THE INVENTION

The present invention relates to programming interfaces for controllers and, more particularly, to a graphical interface for programming ramping controllers.

BACKGROUND OF THE INVENTION

Many commercial (such as food preparation) and industrial (such as plastic product fabrication) processes utilize heaters as an integral part of the process. In most, if not all, of these applications, the temperature of the heater or its heat output, is quite important. The food, product or process needs to be exposed to heat of a certain temperature. Also, not only must the heater achieve a certain temperature, but it should also be able to maintain the surrounding environment at a certain temperature. In order to provide the power necessary for the heater to achieve and maintain a set temperature point a heater controller is coupled to the heater. The controller regulates the power that is applied to the heater which in turn regulates the output temperature of the heater.

Some processes require that the temperature vary over a period of time. Such a graph of temperature variance over time can be termed a temperature profile. A temperature profile is thus a curve of the various required temperatures the heater must attain over a given period of time.

One type of heater controller that is designed to accommodate varied temperatures over a given period of time is known as a ramping controller. The ramping controller regulates a connected heater by comparing the actual temperature of the heater as determined by a temperature sensor and adjusting the power supplied to the heater accordingly. The heater is ramped into the appropriate temperature. In current ramping controllers, the ramping profile must be inputed into the ramping controller via front panel buttons in a program like fashion. Each step of the ramping profile must be laboriously entered via the buttons in the ramping controller's own programming language.

From the foregoing, it is evident that the programming of ramping profiles into ramping controllers is tedious and complicated. Further, it is not possible with current ramping controllers to easily view the ramping profile once it has been entered into the ramping controller.

It is thus an object of the present invention to provide easier entry of a ramping profile into a ramping controller.

It is another object of the present invention to provide a visual graph of the ramping profile.

It is further an object of the present invention to provide a graphical user interface and data logging apparatus for programming a ramping controller and viewing the data obtained therefrom.

It is yet another object of the present invention to provide a graphical user interface for programming a plurality of ramping controllers.

It is still another object of the present invention to monitor the plurality of ramping controllers and data log various parameters of the heaters coupled to the ramping controllers.

SUMMARY OF THE INVENTION

In one form thereof, the present invention is a graphical user interface (GUI) apparatus for programming a ramping controller. The GUI utilizes a display device to display a Cartesian coordinate system graph (2-dimensional grid) of function versus time onto which a user plots a temperature versus time ramping profile and/or an event versus time ramping profile via an input device. The GUI translates the ramping profile into controller logic and creates a corresponding data file. The data file is then transferred to the ramping controller which stores the data file in its memory. This eliminates the cumbersome task of front panel profile entry into the ramping controller.

In the preferred form a microcomputer or the like, in communication with a ramping controller coupled to a heater and temperature sensor, is programmed to display the function (e.g. temperature) versus time graph on an associated display device such as a monitor. The inputted time intervals and temperature increments may be scaleable, for example in multiples of ten. The user plots an initial temperature of a desired profile at time zero using an input device in communication with the microcomputer to position the cursor and select the desired point. Each successive point is plotted on the graph based on the next desired temperature and the time interval between the previous point and the current point. The process is continued until the complete ramping control profile has been created graphically. The GUI also allows the editing of the ramping profile on screen before it is loaded into the ramping controller.

According to another aspect of the present invention, various events that are also controlled by the ramping controller may be turned on or off by plotting the event on the graph at the appropriate time interval relative to the temperature points. The events can be used to allow the on/off control of auxiliary functions/devices such as fans, alarms, and actuators.

According to yet another aspect of the present invention, multiple ramping controllers may be coupled to the microcomputer and can be programmed through addressing the controller through the software. Each ramping controller is associated with an address such that a custom ramping profile may be generated and stored for each ramping controller. The particular ramping controller profile is then loaded into the addressed controller. In the monitor mode, the set point and actual temperature of each heater may be monitored through communication with the ramping controller which, of course, is in communication with the microcomputer through addressing.

According to still another aspect of the present invention, various heater parameters for each addressed heater may be monitored, logged and stored in memory for later verification. The various parameters may also be visually monitored (e.g. graphed) in real time from the setup screen. An example of some of the parameters could be power percentage applied to the heater and on/off times of the heater. The temperature set point and actual temperature of the heater may also be shown and monitored through various means such as resistance/voltage measurements and relationships, or signal coupling with sensors.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, or the invention may admit to other equally effective embodiments. Reference the Appended drawings, wherein:

FIG. 5 is an illustration of what is shown on the display device when the program is in the monitor mode;

FIG. 6 is an illustration of what is shown on the display device when the program is in the configure mode;

FIG. 7 is a first example of an illustration of what is shown on the display device when the program is in the ramp mode depicting a first example ramping profile; and FIG. 8 is a second example of an illustration of what is shown on the display device when the program is in the ramp mode depicting a second example ramping profile with events.

DETAILED DESCRIPTION

Figure 1:
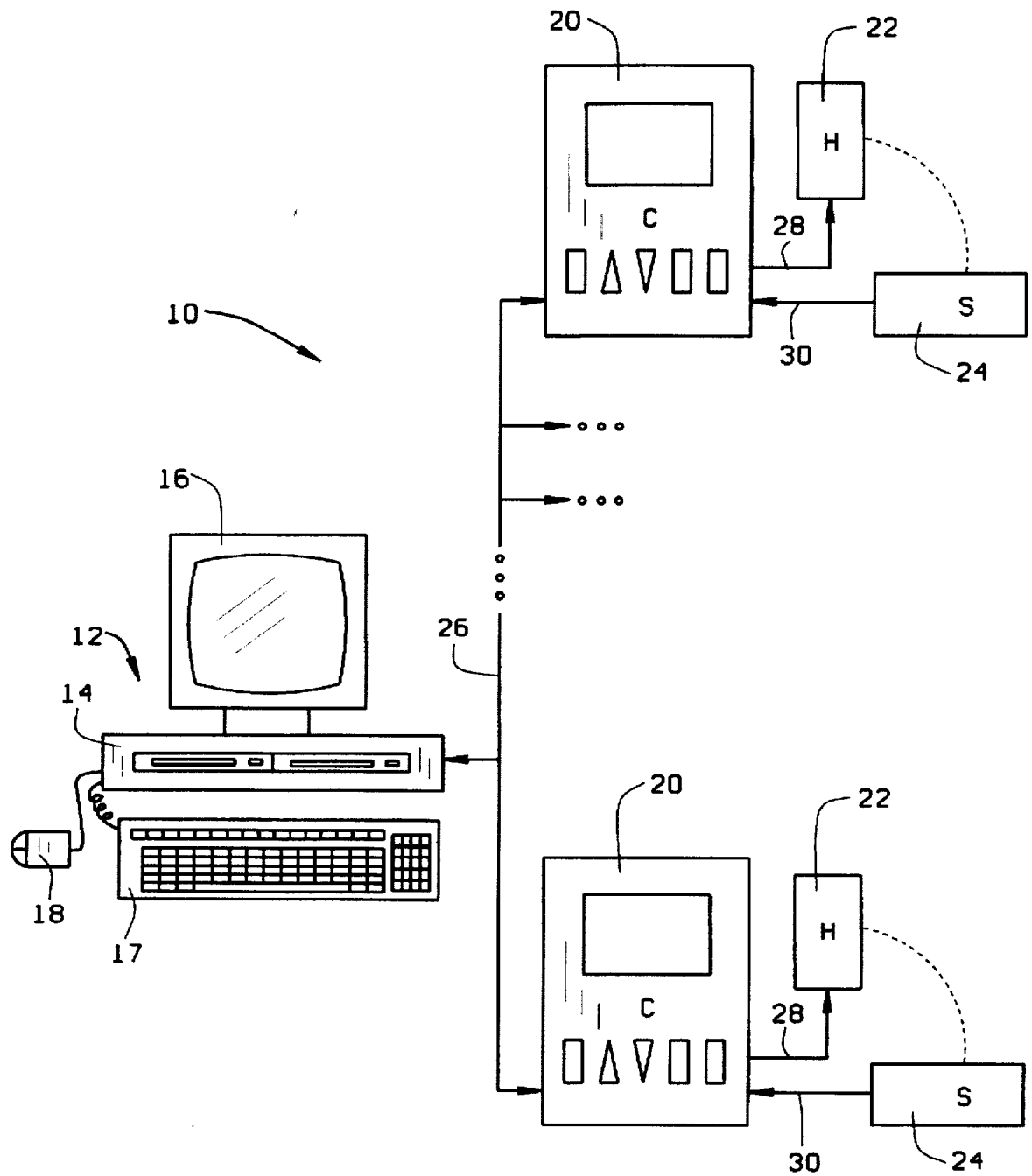
FIG. 1 is a diagrammatic representation of a typical setup used to practice the present invention.

Referring now to FIG. 1, there is shown a layout or setup of the components utilized in the present invention, the setup generally designated 10. The setup 10 includes a microcomputer 12 capable of executing a program or of being programmed as described hereinbelow. The microcomputer 12 may be a standard personal computer such as a laptop or desktop model, or may be a specially programmed device capable of functioning in the manner described hereinbelow. The microcomputer 12 includes a CPU 14, with standard related components necessary for operation and is in communication with a display device or monitor 16, a keyboard 17, and a mouse 18. The keyboard 17 and/or mouse 18 is utilized as the input device(s) for the microcomputer 12 but it should be recognized that other types of input devices may be used in conjunction with the keyboard 17 and/or mouse 18 or in place thereof. The display device 16 may be a standard CRT or other apparatus capable of displaying the requisite screens or graphics.

Coupled to the CPU 14 via a control and sensing link, generally an electrical link 26, such as a standard digital electrical link, are a plurality of ramping controllers each generally designated 20. The present invention is designed to be in communication with one controller 20 or a multiplicity of controllers 20 as depicted in FIG. 1. The principles described hereinbelow may be applied to one controller or many. One controller may thus be linked to the microcomputer or many. The ramping controller may be any type of ramping controller such as a Watlow series 982 ramping controller manufactured by Watlow Electric Manufacturing Company of St. Louis, Mo. Of course, other types of ramping controllers may be utilized rather than the Series 982.

Each ramping controller 20 is in communication with a heater 22 via an electrical link 28 in a standard fashion. Additionally, a temperature sensor 24, such as a thermocouple, RTD, or the like, is in communication with each ramping controller 20 via an electrical link 30 also in a standard fashion. The dashed line between the heater 22 and the temperature sensor 24 in FIG. 1 indicates that the temperature sensor 24 is able to sense the temperature of the heater 22 in a known manner depending on the type of sensor. In this manner, the temperature sensor 24 aids in the data logging process by supplying a temperature signal to the ramping controller 20 via an electrical link 30 which is then transmitted to the microcomputer 12 via the electrical link 26.

Each ramping controller 20 is performing its normal function of regulating the power supplied to the heater 22 in order to control the temperature of the heater 22 as programmed therein. Depending on the type of ramping controller, there may be other outputs to which may be connected peripheral equipment utilized in conjunction with the heater 22. Such other outputs are termed events, and the ramping controller 20 accepts programming to control such events. Nonexhaustive examples of peripheral equipment that may be utilized as events could be a basket motor of a deep fryer, an alarm, a light, a fan, a valve, or a door opening or closing. Also, the ramping controller 20 may include various inputs to which may be connected relative humidity sensors and temperature sensors, such as thermocouples, RTDs (Resistance Temperature Devices), or thermistors. The signals generated by these input devices are used by the internal logic of the ramping controller 20 to regulate the heater 22. Because this is standard operation for ramping controllers, the details of controller/heater regulation are not discussed herein. Reference should be made to the manufacturer's manuals.

As indicated, one aspect of the present invention is the programming of the ramping controller 20 via a graphical interface. As indicated above, the ramping controller is programmable in several respects. One is the programming of the desired temperature profile of the heater over a given time period, for example the variations of the desired heater temperature over a time period for a cycle of a manufacturing process. Another aspect is the programming of various events as described above over a given time period. In the first instance, the user plots the desired temperature(s) that the heater needs to attain at certain times of the heating process. The resulting plot, curve, or graph of the heater temperature(s) versus time, may be termed a ramping controller profile.

Figure 2:
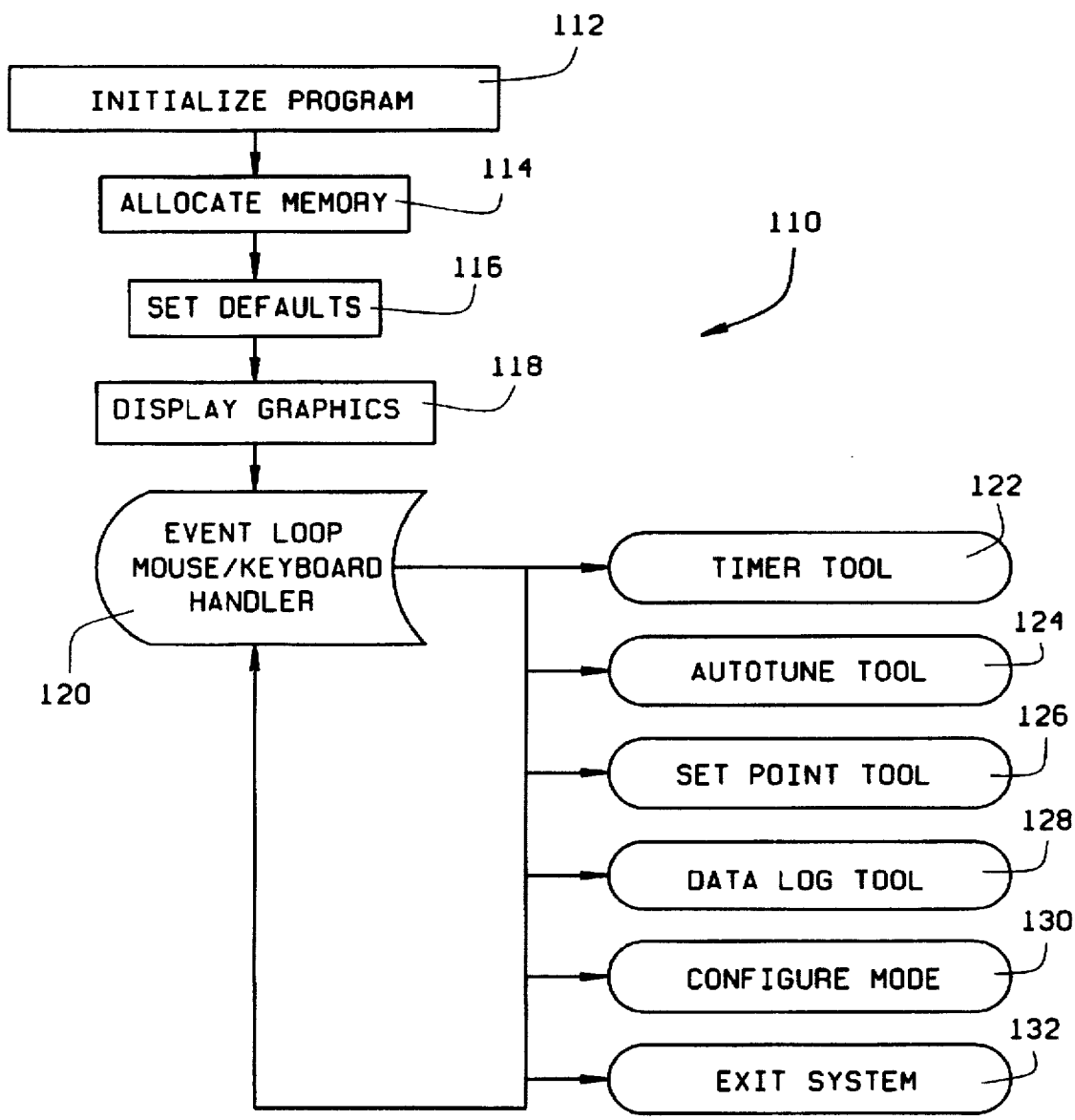
FIG. 2 is a flow chart of the program utilized by the present invention.

The microcomputer 12 is generally programmed as shown in the program flow outline 110 of FIG. 2 and specific reference is now made thereto. It should be noted that any programming language may be used to implement the present invention. The program may also be implemented via a hardwired device or as firmware. When the computer program 110 is invoked, the system is initialized 112, in that the various parameters are initially set and the necessary configurations are correct. The memory necessary for program operation is then allocated 114, and all defaults are set 116. The program 110 then displays the opening screen graphics 118 which is that shown in FIG. 5 and discussed hereinbelow. This is the monitor mode and is essentially the main program screen 68. Once the opening screen 68 is displayed 118 on the display device 16, the program waits for an input 120 from the user. At this point, the user has the choice of six options: the timer tool 122, the autotune tool 124, the set point tool 126, the data log tool 128, the configure mode 130, and exit the program 132.

These options will now be explained with reference to FIG. 5, the monitor mode screen 68. The present invention may monitor multiple controllers through addressing once the controllers are "on-line," as well as program multiple controllers, but only one controller at a time. Therefore, the monitor screen 68 displays a plurality of controller status boxes 70, wherein the controller status boxes 70 have been assigned and correspond to specific controllers, while the other controller status boxes 76 are not assigned. This is easily recognized in FIG. 5 wherein a status line 72 associated with each controller status box indicates whether the particular box has been assigned to a specific controller. If the controller status box has been assigned (e.g. 70) then the status line 72 will have "furnace 1," "furnace 2" or the like. If the controller status box has not been assigned to a specific controller, then the status line 72 will have a generic "address 'X'." Thus, in FIG. 5, the first and second controller status boxes in the first row (from the top left) have been assigned to furnace 1 and furnace 2 respectively while the remaining twenty-eight (28) controller status boxes have not been assigned. It should be understood that while there is depicted thirty (30) controller status boxes, more or less controllers may be represented.

Each controller box includes three indicating circles 73, 74 and 75 that are used to identify which controller is being scanned and whether alarm conditions exist for the heater associated with the controller. In other words, the indicating circles or "lights" 73, 74, 75 are status lights indicating errors in the particular controller/heater system or error free operation of one particular thermal system. Initially, each circle 73, 74, 75 is dull in color indicating that the light is off thus indicating an "off" state. When energized the color will brighten or appear to be brighter indicating an "on" state. The top circle or light 73 is red in color and indicates an error condition when lit. Error conditions are determined by the presence of controller alarms or a break in the communication link between the particular controller and the microcomputer or processor. The middle circle or "light" 74 is yellow indicating, when lit, that the particular controller (controller and thermal system) is being scanned. The bottom circle or "light" 75 is green indicating error free operation of the particular controller and/or thermal system associated therewith. Thus, when the present program is invoked the entire system is scanned to determine what controllers are connected thereto.

It should also be understood that various types of controllers such as ramping controllers, microprocessor-based controllers, digital indicating controllers, and the like, utilizing "on/off" control, PID (Proportional, Integral, Derivative) control or the like may be utilized. Thus, when the program is in the monitor mode, FIG. 5, various types of controllers can be monitored. Of those different types, the ramping controllers may be programmed as explained below. Also, controllers using PID control may be autotuned.

As indicated by the program flow diagram 110 (FIG. 2) the event handler 120 waits for a command which may be accessed from the monitor screen 68 (FIG. 5) by pointing on an appropriate icon or box on the screen and clicking. The exit box 78 allows egress from the program and takes the user back to the operating system. With the other options as indicated on the program flow diagram 110, a specific controller must be chosen by the user to implement the option or function. The specific controller is chosen from the monitor screen 68 by double clicking on the status line 72. The status line 72 indicates the actual temperature of the heater associated with the controller and the assigned name. Once chosen, the user can click on the appropriate box or icon. The clock icon 77 corresponds to the timer tool 122 of the program flow diagram 110 and is used to turn the chosen controller on or off. The "A" box 85 is the autotune function corresponding to the autotune tool 124 of the program flow diagram 110 and is used to automatically have the multiplicity of parameters associated with a PID controller calibrated and/or set. Of course, the PID parameters of a PID type controller may also be manually set via direct access to the controller in accordance with the operator's manual or instructions. When the autotune function is chosen, a "light" 88 in the chosen controller box 70 turns blue. This indicates that the autotune feature is on.

The arrows 86 are for setting the temperature set point of the controller, and correspond to the set point tool 126 of the program flow diagram 126. The arrows may be used to set the temperature point of the chosen controller rather than through the configure mode explained hereinbelow, especially for non-ramping controllers. The "DL" box 87 is the on/off button for the data logging of the chosen controller and corresponds to the data log tool 128 of the program flow diagram 110. This DL button 87 only toggles data logging on or off. In order to change data logging parameters, the user must be in the configure mode. When data logging is activated, a "light" 89 in the chosen controller box 70 is on.

Figure 3:
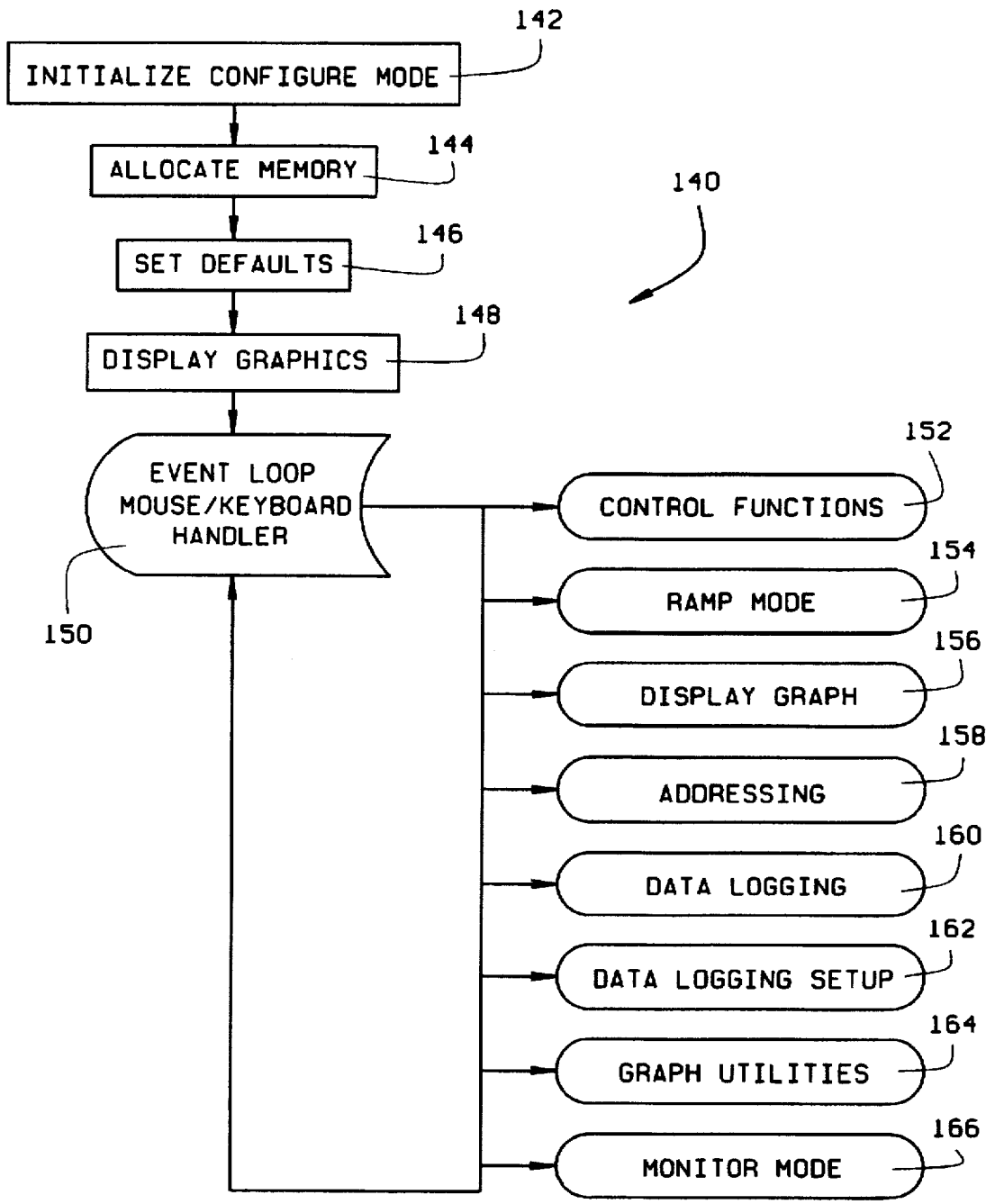
FIG. 3 is a flow chart of the configure mode portion of the program.

When it is desired to configure a particular controller, the status line 72 is double clicked allowing access to the configure mode 130 of the program flow diagram 110. This begins the configure portion of the present program whose flow diagram 140 is depicted in FIG. 3. Also, the display device shows the configure screen graphics 50 depicted in FIG. 6. Referring to FIG. 3, the configure flow diagram 140 is shown. Upon entry into the configure mode, the computer initializes the parameters 142, allocates the necessary memory 144, sets the appropriate defaults, and displays the configure mode screen graphics 148 like the configure screen 50 depicted in FIG. 6. The configure mode program portion 140 then enters an event loop 150 to await an input from the user.

Again, the user has several options as denoted by the various ovals looped to the event loop 150. Of course, the user may select to enter the monitor mode 166 which takes the user back to the monitor screen 68 (FIG. 5) and invokes the monitor program flow 110 (FIG. 2). Additionally referring to FIG. 6, the configure screen 50 is shown as displayed on the display device 16. The configure screen 50 displays a 2-dimensional controller 52 that mimics the look of a real controller 20, including a temperature set point display 67 and an actual temperature display 66. The configure screen 50 also may show when invoked, as explained below, Cartesian coordinate graphs 54 and 84 that respectively display the current actual time and temperature profile for the currently addressed heater/ramping controller and heater power on/off monitoring. The screen 50 also depicts a power utilized bar graph 56, a ramping controller/heater address selecting button 58, a disk drive icon 60 for data logging, a setup button 62, a rescale graph button 64, a ramp button 80, a graph button 82, temperature point arrows 102, a mode button 104, and a set point button 106, all of which are described hereinbelow.

If the user selects any control functions 152, the program 140 begins the control functions portion. If the user desires to program a ramping profile into one of the ramping controllers, the RAMP button 80 on the configure screen 50 is selected and the program 140 enters the ramp mode 154. This aspect is described in detail hereinbelow. However, it should be noted that in order to select which controller to graph its ramping profile, the user clicks on the address box 58 on the configure screen 50 and uses the associated up/down arrows to address the particular controller. The address button 58 is composed of an up arrow, a down arrow, and a display of the currently addressed heater. The microcomputer 12 may be in communication with a plurality of ramping controllers via communication links, each one of the plurality of ramping controllers connected to and regulating a heater or heaters. Each controller/heater may be programmed and/or monitored by the present invention. In order to program and/or monitor the controller/heater, the desired controller/heater must be selected. This is accomplished by assigning a specific address to each controller/heater and selecting the same at the address button 58. When the address box 58 is selected, the program 140 enters the addressing mode 158. The address box 58 and mode 158 are also used to select the desired controller for all functions associated therewith.

Initially, the graphs 54 and 84 are not displayed on the configure screen 50. If it is desired to view the actual time versus temperature graph 54 and the power on/power off graph 84 for a particular controller as selected through the address button 58, the GRAPH button 82 is selected. This invokes the graph utilities routine 164. The power utilized bar graph 56 displays in real time the percentage of power applied to the heater by the ramping controller 20. This data is received by the microcomputer 12 from the controller 20 by the 2-way communications link 26. In addition to displaying the power applied, the data is retained in a data file stored in the microcomputer 12.

The disk drive icon 60 may be used to toggle data logging functions to the designated mass storage device, and is designated by moving the cursor thereon and clicking. This invokes the data logging routine 160. The setup button 62, the ramp button 80, and the graph button 82 may be selected by pointing and clicking in order to set up the parameters for data logging, setting the ramping profile, and viewing the generated graph, respectively. Clicking on the data logging setup button 62 invokes the data logging setup routine 162 and allows the user to select various data logging features such as writing to the disk drive. Other options are changing the temperature set point through arrows 102, changing controller modes button 104 (see the user manual for the particular controller for the various controller modes dependent upon the type of controller utilized), and the set point button 106 to toggle between controller channels or devices. Once it is desired to graphically input a ramping controller profile, the RAMP button 80 is selected.

Figure 4:
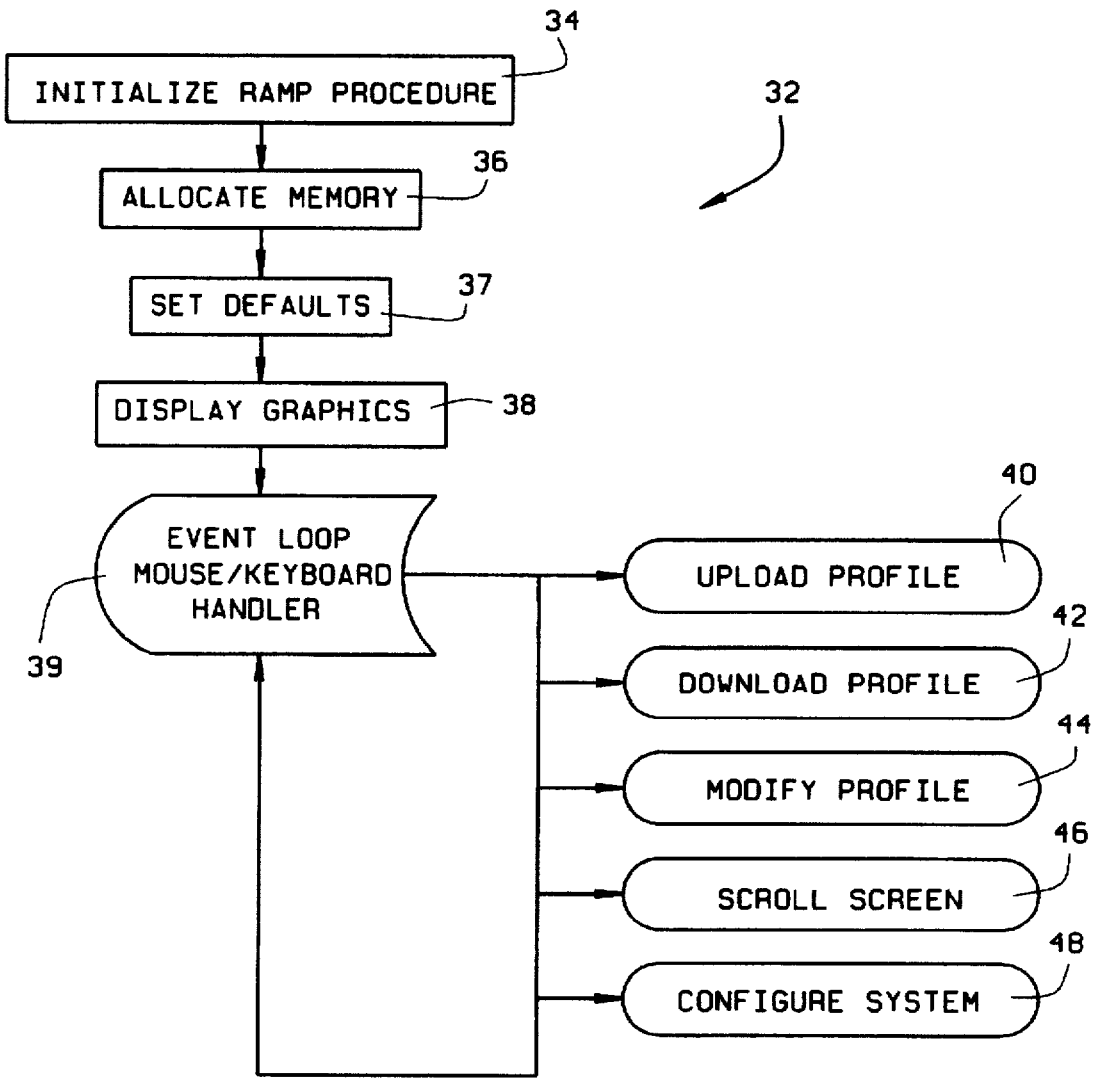
FIG. 4 is a flow chart of the ramp mode portion of the program.

A ramping controller ramping profile is graphically programmed in the following manner. From the configure screen 50, a ramping profile for a particular controller is entered by first selecting the address of the controller via the address button 58. Then the ramp box 80 is selected at which time another screen, a ramp mode screen is shown on the display device. The ramp mode program flow is depicted in FIG. 4 and a ramp mode screen 90 is shown in FIG. 7. Reference is now made to these figures. Upon selection of the ramp button 80, the ramp program 32 is initialized 34, after which memory is allocated 36, defaults are set 37 and the graphics are displayed 38. From Where, the ramp program 32 enters an event loop 39 awaiting function selection from the user.

The ramp mode screen 90 depicts an enlarged temperature versus time graph 54. If it is desired to change the temperature increments, the temperature increment boxes 96 are utilized. If it is desired to change the time period increments, the time period increments boxes 92 are utilized. In this manner, the graph 54 may be resealed. Additionally, by using the up/down/side arrows boxes 94, one may scroll the graph 54 up and down, and back and forth. The ramp mode screen 90 further includes an upper action or tool boxes area 95 which includes various functions for completing the ramping profile. This includes a time box, a temperature box 107, a delete point box 134, a clear grid box 136, a download box 105, an upload box 109, a hold box, and an exit box 108.

The time box indicates the time of the ramping profile, with the temperature box 107 indicating the temperature of the ramping profile. If a temperature point needs to be deleted, the "DEL POINT" box 134 is used. If the whole graph is to be deleted or totally redone, the "CLEAR GRID" box 136 is used. The "download" and "upload" boxes 105, 109 are used to transmit the completed ramping profile to the ramping controller and retrieve the ramping profile from the ramping controller in order to modify or change the profile.

The ramp mode screen 54 includes a temperature box 98 for the Y-axis which, through the increment arrows 96, may be scaled accordingly, depending on the nature of the process utilizing the heater. A time box 97 measured in seconds, minutes, or hours, as desired, is provided for the X-axis. The arrows 92 are used to scale the time accordingly. Lastly, the up/down/left/right arrows 94 are used to scroll the graph 54 if necessary depending on the size of the ramping profile.

Ramp mode example 90, FIG. 7, depicts a plotted simple ramping profile with no events. Ramp mode example 100, FIG. 8, depicts a more complicated plotted ramping profile with an event 1 and an event 2 programmed in addition to the temperature points.

In plotting the ramping profile, the cursor 93 is positioned via the input device (e.g. mouse) to the initial desired temperature at time zero. In both examples 90, 100 this point is 80°. If desired, and as depicted in example 100, events 1 and 2 are toggled on or off. The cursor 93 is positioned at each temperature point and entered until all of the temperature points at the requisite time intervals have been entered. At this point, the completed ramping profile may be transmitted to the controller which stores the profile for use. One may then click on the EXIT button 108 to leave the ramp screen and return to the configure mode screen 50.

While the foregoing is directed to the preferred embodiment of the present invention, other and further embodiments of the invention may be devised without departing from the basic scope thereof, and the scope thereof is determined by the claims which follow.

What is claimed is:

1. An apparatus for programming a ramping controller comprising:

a ramping controller;

a heater coupled to the ramping controller;

a programmed microcomputer with a display device;

a communication device connecting the microcomputer to the ramping controller;

means for displaying a graph of time versus temperature on the display device;

means for plotting desired temperature at desired times on the graph to create a ramping controller profile, the means for plotting connected to the microcomputer;

means controlled by the microcomputer for converting the ramping controller profile into ramping controller logic; and means for transmitting the ramping controller logic to the ramping controller via the communication device.

2. The apparatus for claim 1, further comprising:

means for converting the ramping controller logic into a data file; and means for storing the data file.

3. The apparatus of claim 2, further comprising:

means for monitoring and logging data received from the ramping controller regarding heater power usage and heater temperature.

4. The apparatus of claim 3, further comprising:

means for graphically displaying the heater power usage on the display device.

5. The apparatus of claim 1, further comprising:

a plurality of ramping controllers coupled to the microcomputer;

means for plotting a plurality of ramping controller profiles, one for each of the ramping controllers;

means controlled by the microprocessor for converting each of the plurality of ramping controller profiles into corresponding ramping controller logic; and means for transmitting particular ramping controller logic to the particular ramping controller.

6. An apparatus for graphically programming a ramping controller, the apparatus comprising:

a programmable computer having a monitor, a processor, an input device, and a communication device, the communication device allowing data transfer between the computer and the ramping controller; and whereby the computer is programmed to display a time versus temperature graph on the monitor and wherein temperatures are plotted thereon via the input device to create a graphic ramping controller profile that is translated into ramping controller logic by the processor and transmitted to the ramping controller via the communication device.

7. The apparatus of claim 6, wherein the computer receives real-time data from the ramping controller through the communication device, the real-time data including power applied to the heater, heater temperature, and power on/off, the process translating the real-time data into graphical form which may then be displayed on the monitor.

8. A method of programming a ramping controller, the method comprising the steps of:

(a) displaying a time versus function graph on a display device;

(b) utilizing an input means in communication with the display device and responsive to user manipulation to plot a desired time versus function profile on the displayed time versus function graph;

(c) converting the plotted time versus function profile into ramping controller logic via a processing unit connected to the input means and display device; and (d) loading the ramping controller logic into the ramping controller.

9. The method of claim 8, further comprising the step of:

storing the plotted time versus function profile in a memory means, the memory means connected to the processing unit.

10. The method of claim 9, wherein the display device is a monitor, the input means is a mouse, the memory means is RAM and the processing unit is a CPU, in which the monitor, RAM, and mouse are in communication with the CPU.

11. The method of claim 8, further comprising the step of:

utilizing the input means to plot the functions of temperature and event on/off times on the displayed time versus function graph.

12. The method of claim 8, further comprising the following step after step (c):

creating a data file of the converted plot.

13. A method of programming a ramping controller that is connected to and regulates a heater, the method comprising the steps of:

(a) displaying a cartesian coordinate graph of time versus function wherein function may be one or both of temperature and event on a monitor;

(b) plotting temperature levels at desired time intervals on the cartesian coordinate graph of time versus function via an input device to produce a graphic ramping profile;

(c) plotting any desired events as a function on the graphic ramping profile via the input device;

(d) translating the graphic ramping profile into ramping controller logic via a processor in communication with the monitor and input device to create a ramping controller logic file; and (e) loading the ramping controller logic file into the ramping controller.

14. The method of claim 13, further comprising the step of:

temporarily storing the ramping controller logic file into temporary memory, the temporary memory in communication with the processor.

15. The method of claim 13, wherein the input device is a mouse, the memory is RAM, and the processor is a CPU, in which the monitor, RAM, and mouse are in communication with the CPU.

16. The method of claim 13, further comprising the following step after step (d):

storing the ramping controller logic file in a storage device.

17. The method of claim 13, wherein the step of loading the ramping controller logic file into the ramping controller is accomplished via a digital communication link between the processor and the ramping controller.

18. The method of claim 17, wherein the digital communications link is a hard wired link.

19. The method of claim 17, wherein the digital communications link is an electromagnetic wave link.

* * * * *